United States Patent
Park

(10) Patent No.: US 12,005,929 B2
(45) Date of Patent: Jun. 11, 2024

(54) AUTONOMOUS DRIVING CONTROL SYSTEM AND METHOD OF VEHICLE

(71) Applicant: HYUNDAI MOBIS CO., LTD., Seoul (KR)

(72) Inventor: Seung Jin Park, Seoul (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 217 days.

(21) Appl. No.: 17/332,429

(22) Filed: May 27, 2021

(65) Prior Publication Data

US 2021/0370974 A1 Dec. 2, 2021

(30) Foreign Application Priority Data

Jun. 2, 2020 (KR) .................. 10-2020-0066725

(51) Int. Cl.
*B60W 60/00* (2020.01)
*B60L 53/64* (2019.01)
(Continued)

(52) U.S. Cl.
CPC ......... *B60W 60/0023* (2020.02); *B60L 53/64* (2019.02); *B60L 53/665* (2019.02);
(Continued)

(58) Field of Classification Search
CPC ......... B60W 60/0023; B60W 60/0021; B60W 2510/244; B60W 50/08; B60W 2530/213;
(Continued)

(56) References Cited

U.S. PATENT DOCUMENTS

| 2015/0247734 A1* | 9/2015 | Okada ................ G01C 21/3469 701/423 |
| 2016/0273927 A1* | 9/2016 | Kitajima ............ G01C 21/3415 |

(Continued)

FOREIGN PATENT DOCUMENTS

| CN | 102692899 A | 9/2012 |
| CN | 106207290 A | 12/2016 |

(Continued)

OTHER PUBLICATIONS

Office Action dated Jun. 1, 2023 for counterpart Chinese Patent Application No. 202110613200.4 (see English translation).

(Continued)

*Primary Examiner* — Behrang Badii
(74) *Attorney, Agent, or Firm* — MORGAN, LEWIS & BOCKIUS LLP

(57) ABSTRACT

An autonomous driving control system of a vehicle includes a processor, a navigation, and a driving controller communicatively connected to one another. The processor is configured to estimate a charging amount of a power source that drives a driving device of a vehicle. The navigation is configured to set a driving route based on a destination and to search for a charging station for the power source based on the set driving route. The processor is further configured to determine a charging strategy of the power source based on the estimated charging amount of the power source, the driving route set by the navigation, and the searched charging station. The driving controller is configured to control driving of the vehicle based on the driving route set by the navigation and the determined charging strategy.

10 Claims, 3 Drawing Sheets

(51) Int. Cl.
*B60L 53/66* (2019.01)
*B60W 50/08* (2020.01)
*G01C 21/34* (2006.01)

(52) U.S. Cl.
CPC ........ *B60W 50/08* (2013.01); *B60W 60/0021* (2020.02); *G01C 21/3469* (2013.01); *B60L 2240/54* (2013.01); *B60L 2240/62* (2013.01); *B60L 2260/52* (2013.01); *B60L 2260/54* (2013.01); *B60W 2510/244* (2013.01); *B60W 2530/213* (2020.02)

(58) Field of Classification Search
CPC ....... B60W 2530/209; B60W 2556/50; B60W 60/001; B60W 30/18; B60W 10/24; B60W 40/10; B60W 50/082; B60W 2530/13; B60L 53/64; B60L 53/665; B60L 2240/54; B60L 2260/52; B60L 2260/54; B60L 2240/62; B60L 2240/622; B60L 2240/80; B60L 2260/32; B60L 53/63; B60L 2240/60; G01C 21/3469; G01C 21/3679; Y02E 60/00; Y02T 10/70; Y02T 10/7072; Y02T 10/72; Y02T 10/84; Y02T 90/12; Y02T 90/16; Y02T 90/167; Y04S 10/126; Y04S 30/14; G05D 1/0061; G05D 2201/0213

See application file for complete search history.

(56) References Cited

U.S. PATENT DOCUMENTS

| | | | |
|---|---|---|---|
| 2017/0176195 A1* | 6/2017 | Rajagopalan | B60L 58/12 |
| 2018/0143029 A1* | 5/2018 | Nikulin | G01C 21/3415 |
| 2020/0070801 A1* | 3/2020 | Staats | B60L 53/53 |
| 2020/0124431 A1* | 4/2020 | Heap | G05D 1/0217 |
| 2021/0318685 A1* | 10/2021 | Jenkins | G06Q 30/018 |

FOREIGN PATENT DOCUMENTS

| | | |
|---|---|---|
| CN | 106904085 A | 6/2017 |
| CN | 109765902 A | 5/2019 |
| CN | 111076737 A | 4/2020 |
| DE | 102018108912 A1 | 10/2019 |
| KR | 10-2017-0034696 A | 3/2017 |

OTHER PUBLICATIONS

Office Action dated Nov. 30, 2023 for counterpart Chinese Patent Application No. 202110613200.4 (See English Translation).

* cited by examiner

AUTONOMOUS DRIVING CONTROL SYSTEM AND METHOD OF VEHICLE

CROSS REFERENCE TO RELATED APPLICATION

The present application claims priority to Korean Patent Application No. 10-2020-0066725, filed Jun. 2, 2020, the entire contents of which is incorporated herein for all purposes by this reference.

BACKGROUND

Technical Field

The present disclosure relates to autonomous driving of a vehicle, and more particularly, to driving control capable of optimizing fuel charging of a vehicle that performs autonomous driving.

Description of the Related Art

The development of the technology incorporating various sensors and electronic devices into vehicles is accelerating in order to increase the safety and convenience of users who use vehicles. In particular, a system that provides various functions (e.g., smart cruise control, lane keeping assistance) developed for the user's driving convenience has been mounted on a vehicle.

Accordingly, so-called autonomous driving, in which a vehicle travels on a road in consideration of an external environment by itself without driver's manipulation, has been developing step by step.

An autonomous driving vehicle is equipped with a plurality of sensors and a computing device to control the vehicle according to self-analyzed information on road conditions and driving conditions, while allowing driving to a destination without a driver's intervention.

However, in the autonomous driving technology according to a conventional technology, there is a problem that a strategy for charging fuel at a gas station and the like is not included in a driving strategy for driving to a destination.

The matters described as background art are only for improving understanding of the background of the present disclosure, and should not be taken as acknowledging that they correspond to the prior art already known to those of ordinary skill in the art.

SUMMARY

The present disclosure has been proposed to solve such a problem, and is to provide an autonomous driving control technology including a charging strategy of a power source that drives a driving device of a vehicle.

In order to achieve the purpose above, the autonomous driving control system of a vehicle according to the present disclosure includes a processor, a navigation, and a driving controller communicatively connected to one another. The processor is configured to estimate a charging amount of a power source that drives a driving device of a vehicle. The navigation is configured to set a driving route based on a destination and to search for a charging station for the power source based on the set driving route. The processor is further configured to determine a charging strategy of the power source based on the estimated charging amount of the power source, the driving route set by the navigation, and the searched charging station. The driving controller is configured to control driving of the vehicle based on the driving route set by the navigation and the determined charging strategy.

The autonomous driving control system may further include an inputter configured to receive the destination of the vehicle or selectively receives a required arrival time of the vehicle may be further included. The processor may determine the charging strategy based on the destination and the required arrival time when the required arrival time is inputted to the inputter.

The processor may calculate an expected fuel economy of the vehicle based on the driving route set by the navigation, calculate an available driving distance or a required charging amount based on the calculated expected fuel economy and the estimated charging amount of the power source, and determine the charging strategy based on the calculated available driving distance or the required charging amount.

The processor may calculate a charging cost of the power source based on cost information of the searched charging station, and determine a minimum cost strategy that minimizes the calculated charging cost as the charging strategy.

The processor may calculate the charging cost of the power source based on inputted or pre-stored vehicle or user's payment information.

When the processor determines the minimum cost strategy as the charging strategy, the driving controller may divide the driving route into a plurality of sections based on driving information of the driving route set by the navigation, allocate a required time for each section, and control the driving of the vehicle based on an optimum fuel economy according to the required time allocated for each section and the driving information.

The processor may calculate a required time according to the driving route set by the navigation based on expected charging time of the searched charging station, and determine a minimum time strategy that minimizes the calculated required time as the charging strategy.

The processor may calculate a charging cost of the power source based on cost information of the charging station included in the minimum time strategy in which the calculated required time is calculated equally, and determine the minimum time strategy that minimizes the calculated charging cost as the charging strategy.

When the processor determines the minimum time strategy as the charging strategy, the driving controller may control the driving of the vehicle to minimize the required time according to the driving route set by the navigation.

The processor may receive a selection of the charging strategy manually from a user among a plurality of strategies, or automatically select the charging strategy based on a driving mode of the vehicle.

In order to achieve the purpose above, the method for controlling autonomous driving of a vehicle according to the present disclosure includes steps of setting a driving route based on a destination of a vehicle; searching for a charging station of a power source that drives a driving device of the vehicle based on the set driving route; determining a charging strategy of the power source based on a charging amount of the power source, the set driving route, and the searched charging station; and controlling the driving of the vehicle based on the set driving route and the determined charging strategy.

The method may further include, prior to the step of setting a driving route, a step of receiving the destination of the vehicle or selectively receiving a required arrival time of the vehicle may be further included. In the step of determining a charging strategy, when the requested arrival time is inputted, the charging strategy may be determined based on the destination and the requested arrival time.

The method may further include, prior to the step of determining a charging strategy, steps of calculating an expected fuel economy of the vehicle based on the set driving route; and calculating an available driving distance or a required charging amount based on the calculated expected fuel economy and an estimated charging amount of the power source may be further included. In the step of determining a charging strategy, the charging strategy may be determined based on the calculated available driving distance or the required charging amount.

In the step of determining a charging strategy, a charging cost of the power source may be calculated based on cost information of the searched charging station, and a minimum cost strategy that minimizes the calculated charging cost may be determined as the charging strategy.

In the step of determining a charging strategy, the charging cost of the power source may be calculated based on inputted or pre-stored vehicle or user's payment information.

In the step of controlling the driving of the vehicle, when the minimum cost strategy is determined as the charging strategy, the driving route may be divided into a plurality of sections based on driving information of the set driving route, a required time may be allocated for each section, and the driving of the vehicle may be controlled based on an optimal fuel economy according to the required time allocated to each section and the driving information.

In the step of determining a charging strategy, a required time according to the set driving route may be calculated based on an expected charging time of the searched charging station, and a minimum time strategy that minimizes the calculated required time may be determined as the charging strategy.

In the step of determining a charging strategy, a charging cost of the power source may be calculated based on cost information of the charging station included in the minimum time strategy in which the calculated required time is calculated equally, and the minimum time strategy that minimizes the calculated charging cost may be determined as the charging strategy.

In the step of controlling the driving of the vehicle, when the minimum time strategy is determined as the charging strategy, the driving of the vehicle may be controlled to minimize the required time according to the set driving route.

In the step of determining a charging strategy, a selection of the charging strategy may be manually input from a user among a plurality of strategies, or the charging strategy may be automatically selected based on a driving mode of the vehicle.

In the autonomous driving control system of a vehicle and method thereof according to the present disclosure, it has the effect of implementing autonomous driving that reflects a charging strategy according to a user's intention.

In addition, accordingly, it has the effect of optimizing a charging cost of a power source or optimizing driving time according to a driving route.

DETAILED DESCRIPTION

Figure 1:
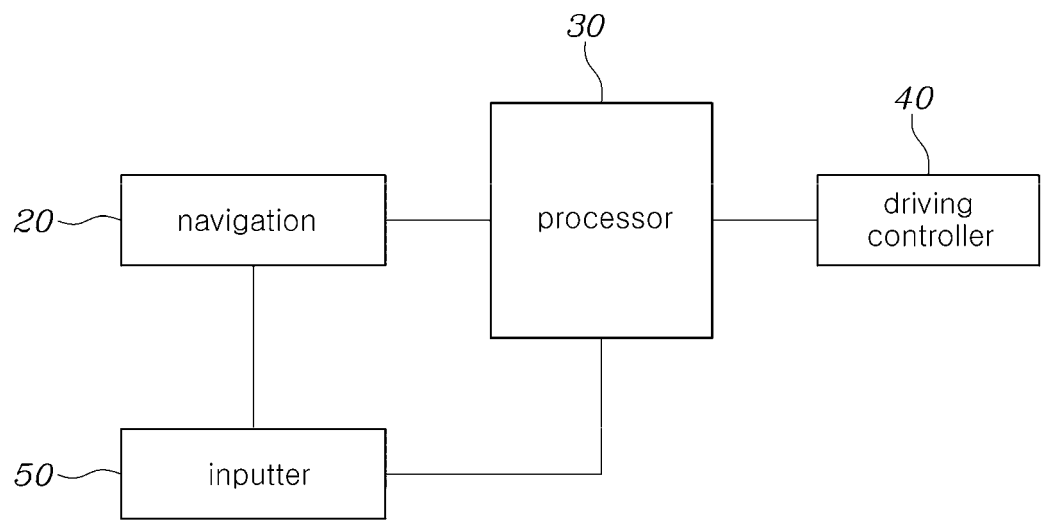
FIG. 1 is a block diagram of an autonomous driving control system of a vehicle according to an embodiment of the present disclosure.

Specific structural or functional descriptions of the embodiments of the present disclosure disclosed in this specification or application are exemplified only for the purpose of describing the embodiments according to the present disclosure, and the embodiments according to the present disclosure may be implemented in various forms, and should not be construed as being limited to the embodiments described in this specification or application.

Since the embodiments according to the present disclosure can be modified in various ways and have various forms, specific embodiments are illustrated in the drawings and will be described in detail in the present specification or application. However, this is not intended to limit the embodiments according to the concept of the present disclosure to a specific form of disclosure, and it should be understood that all changes, equivalents, and substitutes included in the spirit and scope of the present disclosure are included.

Terms such as first and/or second may be used to describe various components, but the components should not be limited by the terms. The above terms are only for the purpose of distinguishing one component from other components, for example, without departing from the scope of the rights according to the concept of the present disclosure, the first component may be referred to as the second component, and similarly the second component may also be referred to as a first component.

When a component is referred to as being "connected" or "contacted" to another component, it should be understood that it may be directly connected or contacted to the other component, but other components may exist in the middle. On the other hand, when a component is referred to as being "directly connected" or "directly contacted" to another component, it should be understood that there is no other component in the middle. Other expressions describing the relationship between components, such as "between" and "just between" or "adjacent to" and "directly adjacent to" should be interpreted as well.

The terms used in the present specification are only used to describe specific embodiments, and are not intended to limit the present disclosure. Singular expressions include plural expressions unless the context clearly indicates otherwise. In the present specification, terms such as "comprise" or "have" are intended to designate the presence of a set feature, number, step, action, component, part, or combination thereof, but it should be understood that the presence or additional possibilities of one or more other features, numbers, steps, actions, components, parts, or combinations thereof are not preliminarily excluded.

Unless otherwise defined, all terms used herein, including technical or scientific terms, have the same meaning as commonly understood by one of ordinary skill in the art to which the present disclosure belongs. Terms such as those defined in a commonly used dictionary should be interpreted as having a meaning consistent with the meaning of the related technology, and should not be interpreted as an ideal or excessively formal meaning unless explicitly defined in the present specification.

Hereinafter, the present disclosure will be described in detail by describing a preferred embodiment of the present disclosure with reference to the accompanying drawings. The same reference numerals shown in each drawing indicate the same members.

FIG. 1 is a block diagram of an autonomous driving control system of a vehicle according to an embodiment of the present disclosure.

Referring to FIG. 1, the autonomous driving control system of a vehicle according to an embodiment of the present disclosure includes a processor 30 that estimates a charging amount of a power source that drives a driving device of a vehicle; a navigation 20 that sets a driving route based on a destination and searches for a charging station for the power source based on the set driving route; the processor 30 that determines a charging strategy of the power source based on the charging amount of the power source estimated by the processor 30, the driving route set by the navigation 20, and the searched charging station; and a driving controller 40 that controls driving of the vehicle based on the driving route set by the navigation 20 and the charging strategy determined by the processor 30.

The processor 30, the navigation 20, the driving controller 40 and the inputter 50 according to an exemplary embodiment of the present disclosure may be implemented by an algorithm configured to control the operation of various components of the vehicle and a nonvolatile memory (not shown) configured to store data related to software instruction reproducing the algorithm. The processor 30 may be configured to perform the operation described below using the data stored in the memory. Here, the memory and the processor may be implemented as separate chips. Alternatively, the memory and processor may be implemented as a single chip integrated with each other. The processor may take the form of one or more processors.

The processor 30, the navigation 20, the driving controller 40, and the inputter 50 according to one embodiment may be included in the electronic control unit (ECU) of a vehicle, or in a separate controller that controls the autonomous driving of the vehicle.

The processor 30 may estimate a charging amount of a power source that drives a driving device of a vehicle in real time. The driving device of the vehicle may be a device that generates various power, such as an engine or a motor, and the power source is a fuel or energy source of the driving device, and may be gasoline, diesel, electricity, or hydrogen.

Specifically, the processor 30 may estimate the charging amount of the power source stored in a fuel tank or battery that stores the power source. In one embodiment, the charging amount of the power source may be estimated by sensing the volume or load of the fuel stored in the fuel tank, sensing the pressure inside the fuel tank, or sensing the state of charge (SOC) of the battery or the like.

The navigation 20 may set a driving route of a vehicle based on the destination input to the vehicle. Specifically, the navigation 20 may be connected to a GPS to receive the current location of the vehicle, and may be connected to a communication device to receive real-time traffic condition. The navigation 20 may set various driving routes such as the shortest time priority, the shortest distance priority, or toll-free road priority based on the input real-time traffic condition, and select one of the set driving routes.

In addition, the navigation 20 may search for a charging station of a power source based on a driving route. In particular, the navigation 20 may search for a charging station of a power source located on the driving route or located less than a preset distance in the driving route.

In addition, a charging station may be searched based on the type of the power source preset for each vehicle. In other words, in the case of an electric vehicle (EV), an electric charging station can be searched, in the case of an engine vehicle, a gas station can be searched, in the case of a hydrogen vehicle (FCEV), a hydrogen station can be searched, and in the case of a rechargeable hybrid vehicle (PHEV), an electric charging station and gas station can be searched, respectively.

The processor 30 may determine a charging strategy of a power source based on the charging amount of the power source in the driving route and the searched charging station. Here, the charging strategy may be a control strategy regarding how many times the power source is charged on the driving route, or which charging station among the searched charging stations charges the power source.

The driving controller 40 may control the driving of a vehicle based on the set driving route and the determined charging strategy. Specifically, the driving controller 40 may control autonomous driving of the vehicle by controlling various sensors, driving devices, and steering devices of the vehicle.

An inputter 50 that receives a destination of a vehicle or selectively receives a required arrival time of the vehicle is further included. The processor 30 can determine a charging strategy based on the destination and the required arrival time when the required arrival time is input to the inputter 50.

The inputter 50 may be an operation panel or an audio video navigation (AVN) device directly operated by a driver or a user, and may be a communication device wirelessly connected to a mobile communication terminal or the like as another embodiment.

Figure 2A:
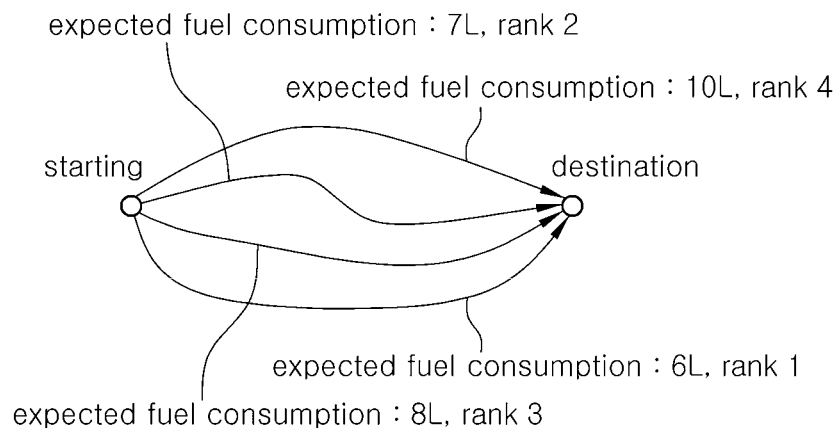
FIG. 2A-FIG. 2C are diagrams illustrating the driving route setting of a navigation and the driving control of a driving controller according to an embodiment of the present disclosure.
Figure 2B:
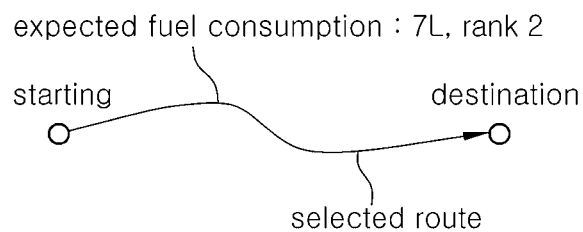
Figure 2C:
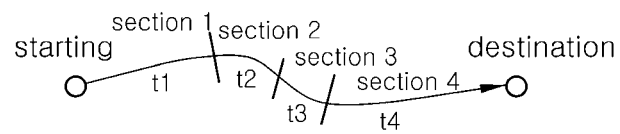

FIG. 2A-FIG. 2C are diagrams illustrating the driving route setting of the navigation 20 and the driving control of the driving controller 40 according to an embodiment of the present disclosure.

Referring further to FIG. 2A-FIG. 2C, a driver or a user may input a destination of a vehicle through the inputter 50, and may selectively input a required arrival time of the vehicle. In one embodiment, the requested arrival time may be input by limiting to a range between a plurality of requested arrival times according to a plurality of driving routes set by the navigation 20.

The navigation 20 may set a driving route based on an input destination and an optionally input requested arrival time of a vehicle.

In one embodiment, the navigation 20 may select a route that can reach the destination within the required arrival time while having the lowest fuel consumption among various routes that can reach the destination selected by the user as a minimum cost driving route.

As shown in FIG. 2A, the navigation 20 may generate a driving profile by reflecting the current traffic conditions for each section of roads. Here, the road may be divided into sections according to types of roads such as highways and congested roads in the city, or sections according to the average speed of the road according to the current traffic conditions.

In addition, the navigation 20 calculates an expected fuel consumption in a corresponding route by using an expected average driving speed profile for each route and the data of an average fuel economy table for each vehicle speed, and can assign a rank to each of the searched routes by assigning 1 to the route with the smallest expected fuel consumption and 2 to the route with the next smallest expected fuel consumption.

Here, the highest rank is designated as 1, and then 2, 3, and 4, are designated, and a rank may be assigned to the searched routes according to the expected fuel consumption.

After designating the ranks of the searched routes as described above, only routes that can satisfy the requested arrival time are extracted from these routes, and a route with the highest rank among the extracted routes is selected.

For reference, FIG. 2B indicates the route with rank 2 in which the expected fuel consumption was 7 L was selected among the searched routes as shown in FIG. 2A. The route that was assigned with rank 1 in which the expected fuel consumption was 6 L was eliminated because it could not meet the required arrival time.

The expected fuel consumption for each route may be calculated using a previously stored average fuel economy table for each vehicle speed, and a higher rank may be given to a route with a smaller fuel consumption.

The processor 30 may set a driving route using the destination of the vehicle input from the inputter 50 and determine a charging strategy at the same time. Particularly, when the requested arrival time is inputted from the inputter 50, the processor 30 may determine the charging strategy while setting a driving route by considering the requested arrival time as well as the destination.

The processor 30 can calculate an expected fuel economy of a vehicle based on the driving route set in the navigation 20, calculate an available driving distance or a required charging amount based on the calculated expected fuel economy and the charging amount of the power source estimated by the processor 30, and determine a charging strategy based on the calculated available driving distance or the required charging amount.

The processor 30 may calculate the expected fuel economy of a vehicle based on the driving route set by the navigation 20. Specifically, the processor 30 may calculate an expected fuel economy in consideration of road conditions of the driving route (e.g., highways, national roads, unpaved roads, etc.), real-time traffic conditions (congestion, light-traffic, etc.), and the expected fuel economy of the vehicle may be calculated by further using the driving data or fuel economy data previously stored in the vehicle.

In addition, the processor 30 may calculate the available driving distance or the required charging amount based on the calculated expected fuel economy and the charging amount of the power source estimated by the processor 30.

In one embodiment, the processor 30 may calculate the available driving distance by multiplying the calculated expected fuel economy by the estimated charging amount of the power source. The processor 30 may determine a charging strategy to charge at a charging station located within the calculated available driving distance among the searched charging stations of the power source.

In another embodiment, the processor 30 may calculate the required amount of the power source using the set driving route and the calculated expected fuel economy, and calculate the required charging amount by comparing the calculated required amount of the power source with the estimated charging amount of the power source. The processor 30 may determine the number of charging times and the charging amount to charge the power source on the driving route based on the required charging amount as a charging strategy.

In another embodiment, the processor 30 may determine a charging strategy by simultaneously using an available driving distance and a required charging amount. The processor 30 may determine a charging strategy to charge the required charging amount, but may determine a charging strategy to charge before an available driving distance. In particular, the processor 30 may determine the number of times of charging and the amount of charging according to the strategy selected from a plurality of strategies to be described later.

In one embodiment, the processor 30 may determine a charging strategy such that the number of times of charging is minimized in consideration of the maximum charging amount of a vehicle in case of a minimum time strategy among a plurality of strategies to be described later.

In another embodiment, the processor 30 may determine a charging strategy to minimize a charging cost even if the number of charging increases so as to minimize the charging cost in the case of the minimum cost strategy among a plurality of strategies to be described later. In particular, in order to drive to a charging station where the charging cost is minimized within an available driving distance, the processor 30 may charge a power source corresponding to a part of a required charging amount, and then the power source corresponding to the remaining part of the required charging amount at the charging station where the charging cost is minimized.

That is, the processor 30 may generate a plurality of preset strategies including a minimum time strategy or a minimum cost strategy to be described later as a charging strategy, and select one of the generated plurality of strategies.

Specifically, the processor 30 may receive a selection of a charging strategy manually from a user among a plurality of strategies, or may automatically select a charging strategy based on a driving mode of a vehicle.

That is, the processor 30 may receive a selection of one of a plurality of strategies manually generated by the user through the inputter 50.

In addition, the processor 30 may automatically select a charging strategy based on a driving mode of a vehicle. The driving mode of the vehicle may be a driving mode in which a driving route is set in the navigation 20 or a driving mode in which the steering, acceleration and deceleration and the like of the vehicle is controlled. In one embodiment, the processor 30 may select a minimum cost strategy when the driving mode of the vehicle is the Eco mode, and may select a minimum time strategy when the driving mode of the vehicle is the Sports mode.

The processor 30 may calculate the charging cost of a power source based on the cost information of a searched charging station, and determine a minimum cost strategy that minimizes the calculated charging cost as a charging strategy.

The cost information of a charging station may be the cost of a power source sold at a corresponding charging station, or may be a cost reflecting a promotion such as a discount.

More specifically, the processor 30 may calculate the charging cost of the power source based on the input or pre-stored vehicle or user's payment information.

In the case of card payment, the input or pre-stored vehicle or user's payment information may include benefits such as discount or rewards corresponding to the card. The user's payment information may be directly or indirectly input or pre-stored in the vehicle, and the vehicle payment information may be pre-stored in the vehicle through Car Pay or the like.

That is, the processor 30 may calculate the charging cost of the power source by simultaneously reflecting the cost information of the charging station and the payment information of the vehicle or the user, and may determine a minimum cost strategy that minimizes the calculated charging cost.

Referring further to FIG. 2C, when the processor 30 determines the minimum cost strategy as a charging strategy, the driving controller 40 may divide the driving route into a plurality of sections based on the driving information of the driving route set in the navigation 20, allocate a required time for each section, and control the driving of a vehicle based on an optimum fuel economy according to the required time allocated for each section and the driving information.

The driving controller 40 can maximize the fuel economy of a vehicle on the premise of arriving at a destination within a required arrival time by dividing a driving route into a plurality of sections and controlling the vehicle to minimize fuel consumption while considering the required time allocated for each section.

Specifically, the driving controller 40 may generate a driving profile by reflecting a current traffic condition for each section of a driving route. Here, the plurality of sections may be divided into sections according to types of roads such as highways and congested roads in the city, or the sections may be divided according to the average speed of roads according to the current traffic condition.

The driving controller 40 may divide the sections of a driving route as shown in FIG. 2C and allocate a required time for each section. In this case, the required time may be allocated for each section such that a value obtained by adding a preset predetermined spare time to the sum of the required times of each section is within a remaining time until a requested arrival time.

When each required time t1 to t4 is allocated to sections 1 to 4 shown in FIG. 2C, t1 to t4 may be allocated such that the following equation is satisfied.

$$t1+t2+t3+t4+\text{spare time} <= \text{remaining time}$$

Here, the spare time is set in order to allow a vehicle to arrive at a destination within the required arrival time as much as possible, even in the case that the time required for the vehicle to travel each section actually becomes longer than expected due to deterioration of the traffic condition. For example, it can be set, such as around 5% of the remaining time.

In particular, the driving controller 40 may control the driving of a vehicle at a speed having an optimum fuel economy according to driving information. Specifically, the vehicle can be driven at a vehicle speed that is as close to the economic speed as possible within a range that satisfies the required time of a corresponding section. The economic speed may be set based on a pre-stored average fuel economy table for each vehicle speed. The average fuel economy table for each speed can be continuously updated.

Alternatively, the driving controller 40 may minimize fuel consumption of a vehicle by driving the vehicle at a vehicle speed as low as possible within a range that satisfies the required time of a corresponding section.

In general, this is because fuel economy tends to decrease as a vehicle speed increases, so when considering this tendency, the driving speed of the vehicle is reduced as much as possible within the range that satisfies the required time, thereby ultimately maximizing fuel efficiency.

In another embodiment, the processor 30 may calculate a required time according to the driving route set in the navigation 20 based on the expected charging time of a searched charging station, and determine a minimum time strategy that minimizes the calculated required time as a charging strategy.

Here, the expected charging time may be calculated in consideration of the congestion level of a searched charging station, the number of chargers at the charging station, real-time traffic conditions in a section before or after the charging station in a driving route, or the like. That is, a time difference between the case of stopping and charging at the corresponding charging station and then starting again and the case of skipping the corresponding charging station may be calculated as the expected charging time.

The processor 30 may calculate the charging cost of a power source based on the cost information of the charging station included in the minimum time strategy in which a calculated required time is calculated equally, and determine the minimum time strategy that minimizes the calculated charging cost as a charging strategy.

Here, the meaning that the calculated required time is calculated equally may mean a case where the calculated required time differs within a preset time range (e.g., 5 minutes).

When the required time calculated for the plurality of minimum time strategies is the same level, the processor 30 may determine the minimum time strategy that minimizes the charging cost as a charging strategy.

When the processor 30 determines the minimum time strategy as the charging strategy, the driving controller 40 may control the driving of a vehicle to minimize the required time according to the driving route set by the navigation 20.

More specifically, when the processor 30 determines the minimum time strategy as the charging strategy, the driving controller 40 may control the speed, lanes, and steering of a vehicle to minimize the required time. That is, the driving controller 40 may control the driving of the vehicle to minimize the required time through active lane change control, acceleration and the like.

Figure 3:
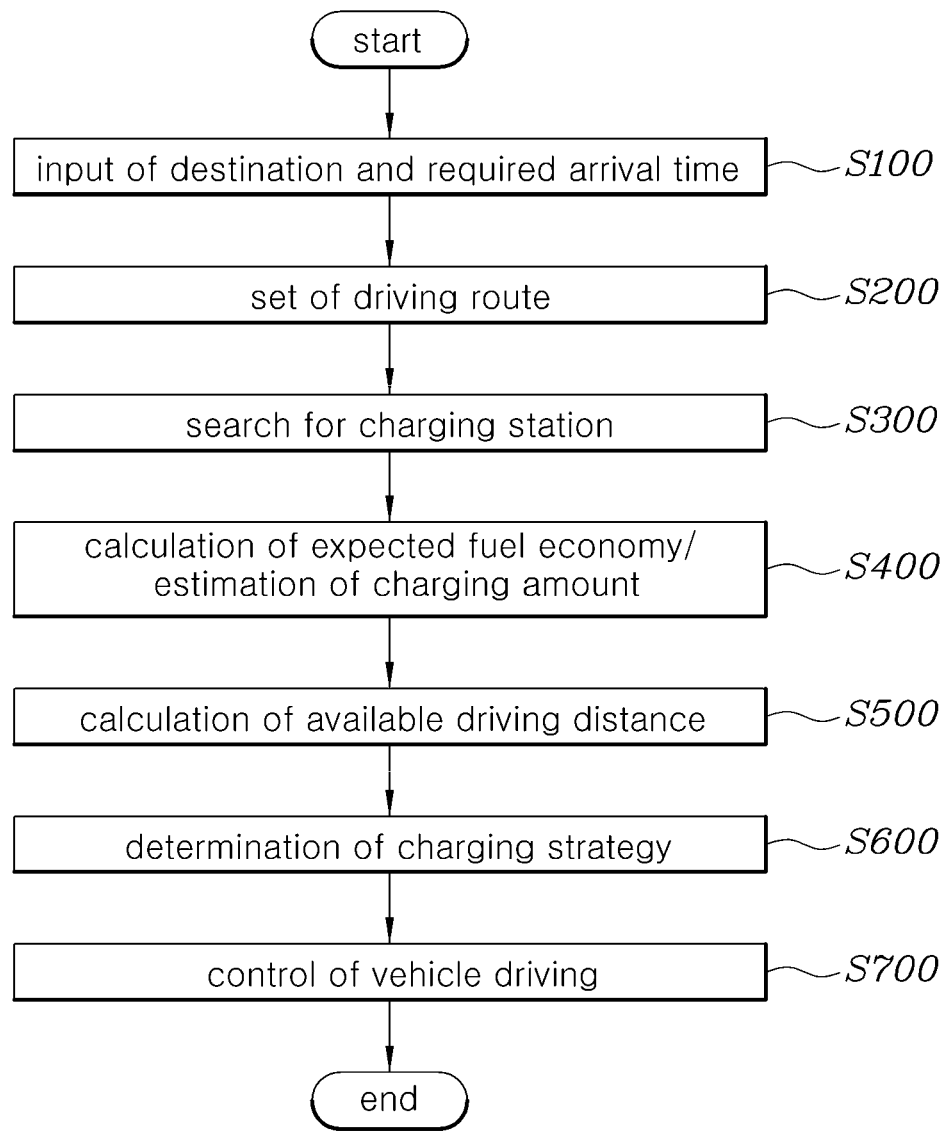
FIG. 3 is a flowchart of a method for controlling autonomous driving of a vehicle according to an embodiment of the present disclosure.

FIG. 3 is a flowchart of a method for controlling autonomous driving of a vehicle according to an embodiment of the present disclosure.

Referring further to FIG. 3, a method for controlling autonomous driving of a vehicle according to an embodiment of the present disclosure includes the steps of setting a driving route based on a destination of a vehicle (S200); searching for a charging station of a power source that drives a driving device of the vehicle based on the set driving route (S300); determining a charging strategy of the power source based on a charging amount of the power source, the set driving route, and the searched charging station (S600); and controlling the driving of the vehicle based on the set driving route and the determined charging strategy (S700).

Prior to determining a charging strategy (S600), the step of estimating the charging amount of the power source (S400) may be further included, and the charging amount of the power source may be estimated in real time.

Prior to the step of setting a driving route (S200), the step of receiving the destination of the vehicle or selectively receiving a required arrival time of the vehicle (S100) may be further included, and, in the step of determining a charging strategy (S600), when the requested arrival time is input, the charging strategy can be determined based on the destination and the requested arrival time.

Prior to the step of determining a charging strategy (S600), the steps of calculating an expected fuel economy of the vehicle based on the set driving route (S400); and calculating an available driving distance or a required charging amount based on the calculated expected fuel economy and the estimated charging amount of the power source (S500) may be further included, and in the step of determining a charging strategy (S600), the charging strategy can be determined based on the calculated available driving distance or the required charging amount.

In the step of determining a charging strategy (S600), a charging cost of the power source may be calculated based on the cost information of the searched charging station, and a minimum cost strategy that minimizes the calculated charging cost may be determined as the charging strategy.

In the step of determining a charging strategy (S600), the charging cost of the power source may be calculated based on the input or pre-stored vehicle or user's payment information.

In the step of controlling the driving of the vehicle (S700), when the minimum cost strategy is determined as the charging strategy, the driving route may be divided into a plurality of sections based on the driving information of the set driving route, a required time may be allocated for each section, and the driving of the vehicle can be controlled based on an optimal fuel economy according to the required time allocated for each section and the driving information.

In the step of determining a charging strategy (S600), the required time according to the set driving route may be calculated based on the expected charging time of the searched charging station, and a minimum time strategy that minimizes the calculated required time may be determined as the charging strategy.

In the step of determining a charging strategy (S600), the charging cost of the power source may be calculated based on the cost information of the charging station included in the minimum time strategy in which the calculated required time is calculated equally, and the minimum time strategy that minimizes the calculated charging cost may be determined as the charging strategy.

In the step of controlling the driving of the vehicle (S700), when the minimum time strategy is determined as the charging strategy, the driving of the vehicle may be controlled to minimize the required time according to the set driving route.

In the step of determining a charging strategy (S600), a selection of a charging strategy may be manually input from a user among a plurality of strategies, or a charging strategy may be automatically selected based on the driving mode of the vehicle.

Although shown and described in relation to specific embodiments of the present disclosure, it will be obvious to those of ordinary skilled in the art that the present disclosure can be variously improved and changed within the limit without departing from the technical spirit of the present disclosure provided by the following claims.

What is claimed is:

1. An autonomous driving control system of a vehicle comprising a processor, a navigation, and a driving controller communicatively connected to one another, wherein:
   the navigation is configured to identify candidate driving routes based on a destination and to search for a charging station for a power source of the vehicle on each of the candidate driving routes,
   the processor is configured to estimate a charging amount of the power source that drives a driving device of the vehicle for each of the candidate driving routes,
   the processor is further configured to calculate a charging cost of the power source based on cost information of the charging station on each of the candidate driving routes, determine a minimum cost strategy that requires a minimum charging cost among the calculated charging costs for all the candidate driving routes as a charging strategy, and select one of the candidate driving routes requiring the minimum charging cost among the candidate driving routes as a driving route,
   the driving controller is configured to autonomously drive the vehicle based on the selected driving route and the charging strategy, and
   the driving controller divides the selected driving route into a plurality of sections based on driving information of the selected driving route, allocates a required time for each section, and autonomously drives the vehicle based on an optimum fuel economy according to the required time allocated for each section and the driving information.

2. The autonomous driving control system of a vehicle according to claim 1, further comprising an inputter configured to receive the destination of the vehicle or selectively receives a required arrival time of the vehicle, and
   wherein the processor determines the charging strategy also based on the destination and the required arrival time when the required arrival time is inputted to the inputter.

3. The autonomous driving control system of a vehicle according to claim 1, wherein the processor calculates an expected fuel economy of the vehicle for each of the candidate driving routes, calculates an available driving distance or a required charging amount based on the calculated expected fuel economy and the estimated charging amount of the power source for each of the candidate driving routes, and determines the charging strategy also based on the calculated available driving distance or the required charging amount for each of the candidate driving routes.

4. The autonomous driving control system of a vehicle according to claim 1, wherein the processor calculates the charging cost of the power source based on inputted or pre-stored vehicle or user's payment information for each of the candidate driving routes.

5. The autonomous driving control system of a vehicle according to claim 1, wherein the processor receives a selection of the charging strategy manually from a user among a plurality of strategies, or automatically selects the charging strategy based on a driving mode of the vehicle.

6. A method for controlling autonomous driving of a vehicle comprising steps of:
   identifying candidate driving routes based on a destination of a vehicle;
   searching for a charging station of a power source that drives a driving device of the vehicle on each of the candidate driving routes;
   calculating a charging cost of the power source based on cost information of the charging station on each of the candidate driving routes, determining a minimum cost strategy that requires a minimum charging cost among the calculated charging costs for all the candidate driving routes as a charging strategy, and selecting one of the candidate driving routes requiring the minimum charging cost among the candidate driving routes as a driving route; and
   autonomously driving the vehicle based on the selected driving route and the charging strategy,
   wherein in the step of controlling the driving of the vehicle, the selected driving route is divided into a plurality of sections based on driving information of the selected driving route, a required time is allocated for each section, and the autonomous driving of the vehicle is based on an optimal fuel economy according to the required time allocated for each section and the driving information.

7. The method for controlling autonomous driving of a vehicle according to claim 6, further comprising, prior to the step of selecting a driving route, a step of receiving the destination of the vehicle or selectively receiving a required arrival time of the vehicle, and
   wherein in the step of determining a charging strategy, when the requested arrival time is inputted, the charging strategy is determined also based on the destination and the requested arrival time.

8. The method for controlling autonomous driving of a vehicle according to claim 6, further comprising, prior to the step of determining a charging strategy, steps of:
   calculating an expected fuel economy of the vehicle for each of the candidate driving routes; and
   calculating an available driving distance or a required charging amount based on the calculated expected fuel economy and an estimated charging amount of the power source for each of the candidate driving routes,
   wherein in the step of determining a charging strategy, the charging strategy is determined based on the calculated available driving distance or the required charging amount for each of the candidate driving routes.

9. The method for controlling autonomous driving of a vehicle according to claim 6, wherein in the step of determining a charging strategy, the charging cost of the power source is calculated based on inputted or pre-stored vehicle or user's payment information for each of the candidate driving routes.

10. The method for controlling autonomous driving of a vehicle according to claim 6, wherein in the step of determining a charging strategy, a selection of the charging strategy is manually inputted from a user among a plurality of strategies, or the charging strategy is automatically selected based on a driving mode of the vehicle.

* * * * *

UNITED STATES PATENT AND TRADEMARK OFFICE
CERTIFICATE OF CORRECTION

| | | |
|---|---|---|
| PATENT NO. | : 12,005,929 B2 | Page 1 of 1 |
| APPLICATION NO. | : 17/332429 | |
| DATED | : June 11, 2024 | |
| INVENTOR(S) | : Seung Jin Park | |

It is certified that error appears in the above-identified patent and that said Letters Patent is hereby corrected as shown below:

On the Title Page

Column 1, Item (73) replace the present listing with the following:
-- (73) Assignee: HYUNDAI MOBIS CO., LTD., Seoul (KR) --

Signed and Sealed this
First Day of April, 2025

Coke Morgan Stewart
*Acting Director of the United States Patent and Trademark Office*